(12) United States Patent
Ma et al.

(10) Patent No.: US 9,946,530 B2
(45) Date of Patent: Apr. 17, 2018

(54) FIRMWARE UPGRADE METHOD AND SYSTEM

(71) Applicant: ZTE Corporation, Shenzhen (CN)

(72) Inventors: Miaomiao Ma, Shenzhen (CN); Yong Yang, Shenzhen (CN); Shuang Yang, Shenzhen (CN); Qi Yang, Shenzhen (CN); Rong Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 97 days.

(21) Appl. No.: 14/769,252

(22) PCT Filed: Sep. 17, 2013

(86) PCT No.: PCT/CN2013/083676
§ 371 (c)(1),
(2) Date: Nov. 17, 2015

(87) PCT Pub. No.: WO2014/127628
PCT Pub. Date: Aug. 28, 2014

(65) Prior Publication Data
US 2016/0103672 A1 Apr. 14, 2016

(30) Foreign Application Priority Data
Feb. 21, 2013 (CN) .......................... 2013 1 0055694

(51) Int. Cl.
G06F 9/44 (2006.01)
G06F 9/445 (2018.01)
(Continued)

(52) U.S. Cl.
CPC .............. *G06F 8/65* (2013.01); *H04L 41/082* (2013.01); *H04L 67/34* (2013.01)

(58) Field of Classification Search
CPC ........... G06F 8/65; G06F 8/67; G06F 11/1433
See application file for complete search history.

(56) References Cited

U.S. PATENT DOCUMENTS

2003/0023793 A1 1/2003 Mantey et al.
2004/0064764 A1 4/2004 Gomez
(Continued)

FOREIGN PATENT DOCUMENTS

CN 101448050 A 6/2009
CN 101551769 A 10/2009
(Continued)

OTHER PUBLICATIONS

International Search Report for corresponding application PCT/CN2013/083676 filed Sep. 9, 2013; dated Dec. 26, 2013.
(Continued)

*Primary Examiner* — Duy Khuong T Nguyen
(74) *Attorney, Agent, or Firm* — Cantor Colburn LLP

(57) ABSTRACT

Provided are a method and system for upgrading firmware. The method includes: an upgrading control single board receives a firmware upgrading request from a master control single board, wherein the firmware upgrading request carries firmware upgrading parameter information; the upgrading control single board determines, according to the firmware upgrading parameter information, a sublink to be upgraded corresponding to the firmware upgrading parameter information; and the upgrading control single board acquires, from the master control single board, firmware upgrading data corresponding to the sublink to be upgraded, and upgrades, by adopting the firmware upgrading data, one or more pieces of firmware on the sublink to be upgraded. According to the solution, under a power-on state of a bare single board to be upgraded, remote firmware upgrading can be performed for the single board, so that the risk of influence of firmware upgrading operation on normal running of the system is lowered.

16 Claims, 5 Drawing Sheets

(51) Int. Cl.
*H04L 12/24* (2006.01)
*H04L 29/08* (2006.01)

(56) References Cited

U.S. PATENT DOCUMENTS

| | | |
|---|---|---|
| 2009/0006915 A1 | 1/2009 | Gomez |
| 2009/0241100 A1* | 9/2009 | Sakurai ............... G06F 11/1433 |
| | | 717/170 |
| 2010/0191867 A1* | 7/2010 | Douglas .................... G06F 8/65 |
| | | 710/8 |
| 2010/0218178 A1* | 8/2010 | Sakai ................. H04N 1/00973 |
| | | 717/170 |
| 2012/0050606 A1* | 3/2012 | Debevec ................ G03B 15/07 |
| | | 348/370 |
| 2012/0159142 A1* | 6/2012 | Jibbe ......................... G06F 8/71 |
| | | 713/100 |
| 2013/0151841 A1* | 6/2013 | McGraw ............. G06F 11/3006 |
| | | 713/100 |
| 2014/0137095 A1* | 5/2014 | Chiu ....................... G06F 8/665 |
| | | 717/171 |
| 2016/0103672 A1* | 4/2016 | Ma ....................... H04L 41/082 |
| | | 717/168 |

FOREIGN PATENT DOCUMENTS

| | | |
|---|---|---|
| CN | 103200026 A | 7/2013 |
| JP | 2003043116 A | 2/2013 |

OTHER PUBLICATIONS

International Search Report for corresponding application EP13876024 dated Feb. 18, 2016; pp. 8.

\* cited by examiner

__US 9,946,530 B2__

FIRMWARE UPGRADE METHOD AND SYSTEM

TECHNICAL FIELD

The present invention relates to the field of communication, and in particular to a method and system for upgrading firmware.

BACKGROUND

With the emergence of information age, popularization of Personal Computers (PC) and wide application of the Internet, computer information technologies have been effectively combined with various walks of life, various emerging technologies and emerging services continuously appear, and requirements of users on data bandwidths increase at the same time. In order to meet a high-bandwidth requirement of an individual user, an operating company requires network equipment to have high capacity and high access and processing performance. In order to meet requirements on high capacity and high access and processing performance, most of network equipment in the related art adopts a distributed system deployed with a large number of Central Processing units (CPU).

Firmware is software embedded into a hardware device, and may be updated by a user. Firmware upgrading refers to improving a working program or source code in hardware by virtue of a special upgrading program to achieve an improvement in compatibility, performance or functions. A difference between firmware upgrading and driver updating is that the firmware upgrading is the updating from a bottom layer of a machine, which is more direct and effective, and is more obvious in performance improvement. Along with gradual popularization and large-scale use of a multi-processor distributed system to the telecommunication industry and increase of a requirement of a user on performance of network equipment, the firmware upgrading of a single board must be more frequent.

Joint Test Action Group (JTAG) is an international standard test protocol (IEEE 1149.1) which has been widely adopted by electronic enterprises throughout the world. Up to now, almost all large-scale and complicated digital circuits are compatible with IEEE 1149.1. Firmware upgrading by virtue of a JTAG interface also becomes a mainstream gradually.

One of the methods for upgrading firmware in a related art is to connect JTAG devices of the entire single board into a daisy chain form in series, set one or more JTAG interfaces according to a practical condition and perform scanning and firmware data loading on all the JTAG devices of the single board through a JTAG socket. However, the method has defects as follows:

(1) firmware upgrading data may be loaded only through the JTAG socket, which causes inconvenience in field maintenance; and (2) firmware data cannot be remotely upgraded.

According to another method for upgrading firmware in the related art, information interaction is performed between a subrack management board and a single board to be upgraded, a target file stored by the subrack management board is loaded into a storage component of the single board to be upgraded, and a controller (for example: a single-chip microcomputer) of the single board to be upgraded controls to write the target file into a JTAG device or a JTAG chain to complete scanning and loading of the JTAG device or the JTAG chain. Although remote upgrading is implemented, such a solution still has shortcomings as follows:

(1) firmware upgrading of the subrack management board and the controller of the single board to be upgraded cannot be implemented, and part of the system still cannot be upgraded; and (2) the controller of the single board to be upgraded is required to be in a working state, and if the controller is in a failure state for a certain reason, firmware upgrading cannot be performed.

SUMMARY

The embodiments of the present invention provide a method and system for upgrading firmware, so as to at least solve the problem that executing firmware upgrading operation by virtue of a master control single board greatly increases a risk in firmware upgrading operation in the related art.

According to one aspect of the embodiments of the present invention, a method for upgrading firmware is provided.

The method for upgrading firmware according to the embodiment of the present invention includes that: an upgrading control single board receives a firmware upgrading request from a master control single board, wherein the firmware upgrading request carries firmware upgrading parameter information; the upgrading control single board determines, according to the firmware upgrading parameter information, a sublink to be upgraded corresponding to the firmware upgrading parameter information; and the upgrading control single board acquires, from the master control single board, firmware upgrading data corresponding to the sublink to be upgraded, and upgrades, by adopting the firmware upgrading data, one or more pieces of firmware on the sublink to be upgraded.

In an example embodiment, before the step that the upgrading control single board receives the firmware upgrading request from the master control single board, the method further includes that: the master control single board receives state information from the upgrading control single board; the master control single board judges, according to the state information, whether the upgrading control single board is currently executing firmware upgrading operation or not; and when it is judged by the master control single board that the upgrading control single board is not executing the firmware upgrading operation currently, the master control single board sends the firmware upgrading request to the upgrading control single board.

In an example embodiment, the step that the upgrading control single board determines, according to the firmware upgrading parameter information, the sublink to be upgraded includes that: the upgrading control single board acquires, according to the firmware upgrading parameter information, physical parameter information corresponding to the sublink to be upgraded; and the upgrading control single board determines, according to the physical parameter information, the sublink to be upgraded.

In an example embodiment, before the step that the upgrading control single board acquires, from the master control single board, the firmware upgrading data corresponding to the sublink to be upgraded, the method further includes that: the master control single board receives a firmware upgrading data request from the upgrading control single board; and the master control single board searches, according to the firmware upgrading data request, for the firmware upgrading data corresponding to the sublink to be upgraded, and sends the firmware upgrading data to the upgrading control single board.

In an example embodiment, before the step that the upgrading control single board receives the firmware upgrading request from the master control single board, the method further includes that: current using states of the upgrading control single board and the master control single board are both determined to be active states.

According to another aspect of the embodiments of the present invention, a system for upgrading firmware is provided.

The system for upgrading firmware according to the embodiment of the present invention includes: at least one upgrading control single board, the upgrading control single board including: a first receiving component, configured to receive a firmware upgrading request from a master control single board, wherein the firmware upgrading request carries firmware upgrading parameter information; a first determination component, configured to determine, according to the firmware upgrading parameter information, a sublink to be upgraded corresponding to the firmware upgrading parameter information; and an upgrading component, configured to acquire, from the master control single board, firmware upgrading data corresponding to the sublink to be upgraded, and upgrade, by adopting the firmware upgrading data, one or more pieces of firmware on the sublink to be upgraded.

In an example embodiment, the system further includes: at least one master control single board, the master control single board including: a second receiving component, configured to receive state information from the upgrading control single board; a judgment component, configured to judge, according to the state information, whether the upgrading control single board is currently executing firmware upgrading operation or not; and a first sending component, configured to, when output of the judgment component is that the upgrading control single board is not executing the firmware upgrading operation currently, send the firmware upgrading request to the upgrading control single board.

In an example embodiment, the first determination component includes: an acquisition element, configured to acquire, according to the firmware upgrading parameter information, physical parameter information corresponding to the sublink to be upgraded; and a determination element, configured to determine, according to the physical parameter information, the sublink to be upgraded.

In an example embodiment, the master control single board includes: a third receiving component, configured to receive a firmware upgrading data request from the upgrading control single board; and a second sending component, configured to search, according to the firmware upgrading data request, for the firmware upgrading data corresponding to the sublink to be upgraded, and send the firmware upgrading data to the upgrading control single board.

In an example embodiment, the upgrading control single board further includes: a second determination component, configured to determine that a current using state of the upgrading control single board is an active state; and the master control single board further includes: a third determination component, configured to determine that a current using state of the master control single board is an active state.

According to the embodiments of the present invention, an upgrading control single board receives a firmware upgrading request from a master control single board, the firmware upgrading request carrying firmware upgrading parameter information; the upgrading control single board determines, according to the firmware upgrading parameter information, a sublink to be upgraded corresponding to the firmware upgrading parameter information; and the upgrading control single board acquires, from the master control single board, firmware upgrading data corresponding to the sublink to be upgraded, and upgrades, by adopting the firmware upgrading data, one or more pieces of firmware on the sublink to be upgraded. By virtue of the above technical solution, the problem that executing firmware upgrading operation by virtue of the master control single board greatly increases the risk in firmware upgrading operation in the related art is solved, and the risk in the firmware upgrading operation is further lowered.

BRIEF DESCRIPTION OF THE DRAWINGS

The drawings described here are adopted to provide further understanding of the present invention, and form a part of the present invention. Schematic embodiments of the present invention and description thereof are adopted to explain the present invention and not intended to form improper limits to the present invention. In the drawings.

DETAILED DESCRIPTION OF THE EMBODIMENTS

The present invention is described below with reference to the drawings and embodiments in detail. It is important to note that the embodiments in the present invention and characteristics in the embodiments can be combined under the condition of no conflicts.

Figure 1:
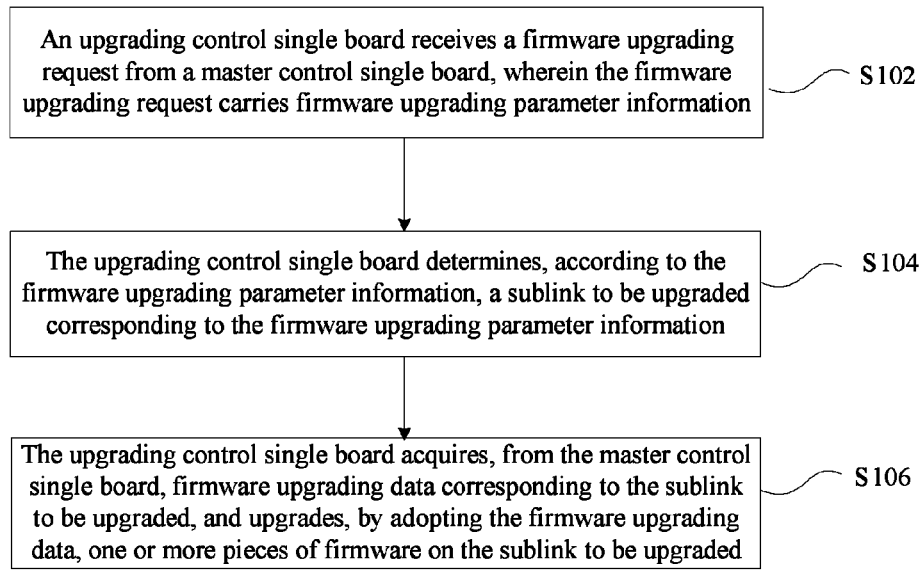
FIG. 1 is a flowchart of a method for upgrading firmware according to an embodiment of the present invention.

FIG. 1 is a flowchart of a method for upgrading firmware according to an embodiment of the present invention. As shown in FIG. 1, the method may include the following processing steps:

Step S102: an upgrading control single board receives a firmware upgrading request from a master control single board, wherein the firmware upgrading request carries firmware upgrading parameter information;

Step S104: the upgrading control single board determines, according to the firmware upgrading parameter information, a sublink to be upgraded corresponding to the firmware upgrading parameter information; and Step S106: the upgrading control single board acquires, from the master control single board, firmware upgrading data corresponding to the sublink to be upgraded, and upgrades, by adopting the firmware upgrading data, one or more pieces of firmware on the sublink to be upgraded.

In the related art, executing firmware upgrading operation by virtue of the master control single board greatly increases a risk in firmware upgrading operation. According to the method shown in FIG. 1, the upgrading control single board receives the firmware upgrading request from the master control single board, the firmware upgrading request carrying the firmware upgrading parameter information; the upgrading control single board determines, according to the firmware upgrading parameter information, the sublink to be upgraded corresponding to the firmware upgrading parameter information; and the upgrading control single board acquires, from the master control single board, the firmware upgrading data corresponding to the sublink to be upgraded, and upgrades, by adopting the firmware upgrading data, the one or more pieces of firmware on the sublink to be upgraded. With the introduction of the upgrading control single board, the time-consuming operation of loading the firmware upgrading data to a JTAG controller is separated from the master control single board, so that the risk in the firmware upgrading operation is reduced. In addition, a system-level JTAG technology is introduced, and firmware upgrading data burning operation is cooperatively completed by the JTAG controller and a JTAG bridge chip, thereby implementing remote firmware upgrading on one hand, and performing firmware upgrading on one or more JTAG devices on a sublink under a condition that a bare single board to be upgraded is powered-on on the other hand. In this way, the problem that executing firmware upgrading operation by virtue of the master control single board greatly increases the risk in firmware upgrading operation in the related art is solved, and the risk in the firmware upgrading operation is further lowered.

In an example embodiment, before the upgrading control single board receives the firmware upgrading request from the master control single board in Step S102, the method may further include the following operation:

Step S1: the master control single board receives state information from the upgrading control single board;

Step S2: the master control single board judges, according to the state information, whether the upgrading control single board is currently executing firmware upgrading operation or not; and Step S3: when it is judged by the master control single board that the upgrading control single board is not executing the firmware upgrading operation currently, the master control single board sends the firmware upgrading request to the upgrading control single board.

In an example embodiment, the master control single board receives a JTAG state registration message from the upgrading control single board so as to acquire the state information of the upgrading control single board, and if the upgrading control single board is performing firmware upgrading operation, the firmware upgrading operation is ended; otherwise the master control single board sends the firmware upgrading request to the upgrading control single board, and in addition, the state information of the upgrading control single board is updated, on the master control single board, to being performing firmware upgrading operation.

In an example embodiment, the operation that the upgrading control single board determines, according to the firmware upgrading parameter information, the sublink to be upgraded in Step S104 may include the following steps:

Step S4: the upgrading control single board acquires, according to the firmware upgrading parameter information, physical parameter information corresponding to the sublink to be upgraded; and Step S5: the upgrading control single board determines, according to the physical parameter information, the sublink to be upgraded.

In the example embodiment, the upgrading control single board parses the firmware upgrading request sent by the master control single board to obtain the firmware upgrading parameter information, performs scanning to acquire, according to the firmware upgrading parameter information, the physical parameter information corresponding to the sublink to be upgraded, and further determines, according to the acquired physical parameter information, the sublink to be upgraded.

In an example embodiment, before the upgrading control single board acquires, from the master control single board, the firmware upgrading data corresponding to the sublink to be upgraded in Step S106, the method may further include the following operation:

Step S6: the master control single board receives a firmware upgrading data request from the upgrading control single board; and Step S7: the master control single board searches, according to the firmware upgrading data request, for the firmware upgrading data corresponding to the sublink to be upgraded, and sends the firmware upgrading data to the upgrading control single board.

In the example embodiment, the upgrading control single board requests for the firmware upgrading data from the master control single board, and loads the firmware upgrading data into a specific storage area of the upgrading control single board, that is, after receiving the firmware upgrading request, the upgrading control single board performs scanning according to a request parameter to acquire the physical parameter information of the sublink to be upgraded, then requests for the firmware upgrading data corresponding to the sublink to be upgraded from the master control single board, loads the firmware upgrading data corresponding to the sublink to be upgraded, and stores data acquired by the upgrading control single board into the specific data storage area.

In an example embodiment, before the upgrading control single board receives the firmware upgrading request from the master control single board in Step S102, the method may further include the following processing:

Step S8: current using states of the upgrading control single board and the master control single board are both determined to be active states.

In the example embodiment of the present invention, active and standby states of the master control single board and the upgrading control single board are further introduced, and field upgrading can be performed for the entire subrack, so that the problem that the system cannot be upgraded entirely in the related art is solved.

Figure 2:
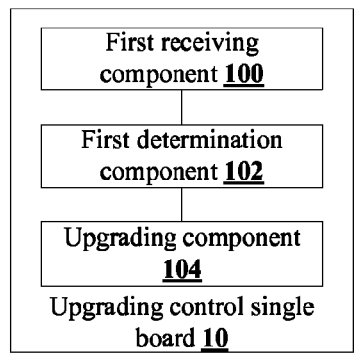
FIG. 2 is a structure diagram of a system for upgrading firmware according to an embodiment of the present invention.

FIG. 2 is a structure diagram of a system for upgrading firmware according to an embodiment of the present invention. As shown in FIG. 2, the system for upgrading firmware may include: at least one upgrading control single board 10, wherein the upgrading control single board 10 may include: a first receiving component 100, configured to receive a firmware upgrading request from a master control single board, the firmware upgrading request carrying firmware upgrading parameter information; a first determination component 102, configured to determine, according to the firmware upgrading parameter information, a sublink to be upgraded corresponding to the firmware upgrading parameter information; and an upgrading component 104, configured to acquire, from the master control single board, firmware upgrading data corresponding to the sublink to be upgraded, and upgrade, by adopting the firmware upgrading data, one or more pieces of firmware on the sublink to be upgraded.

Due to the adoption of the system shown in FIG. 2, the problem that executing firmware upgrading operation by virtue of the master control single board greatly increases a risk in firmware upgrading operation in the related art is solved, and the risk in the firmware upgrading operation is further lowered.

In the example embodiment, the system may include: two master control single boards, two upgrading control single boards and multiple single boards to be upgraded. According to the technical solution provided by the embodiments of the present invention, a system-level JTAG technology is applied, an embedded test controller (for example; a JTAG controller) and a JTAG bridge chip are additionally arranged on each upgrading control single board, and a JTAG bridge chip is additionally arranged on each single board to be upgraded.

Structures of each upgrading control single board and each single board to be upgraded are described below with reference to the example embodiments shown in FIG. 3 and FIG. 4 respectively.

Figure 3:
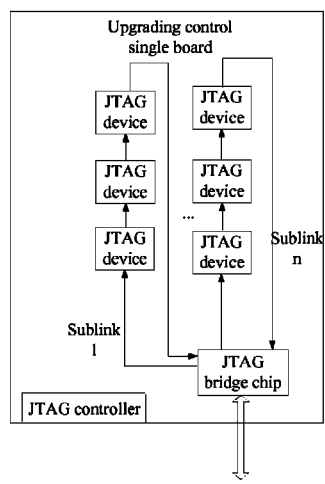
FIG. 3 is a schematic diagram showing a JTAG link structure of an upgrading control single board according to an example embodiment of the present invention.

FIG. 3 is a schematic diagram showing a JTAG link structure of an upgrading control single board according to an example embodiment of the present invention. As shown in FIG. 3, the link structure may include: a JTAG bridge chip, a sublink n and JTAG devices, wherein each part described above is the same as the JTAG bridge chip, sublink n and JTAG devices of the single board to be upgraded. The JTAG controller is configured to receive firmware upgrading data and instruction transmitted by a CPU, generate a JTAG signal, cooperate with the JTAG bridge chip to complete burning the firmware upgrading data, and is also configured to receive a JTAG signal from the single board to be upgraded and feed back a firmware upgrading result.

Figure 4:
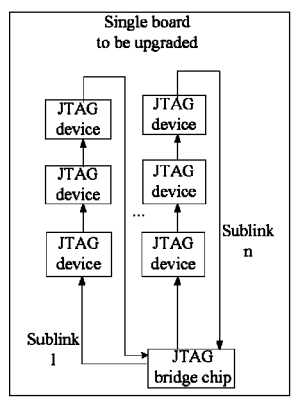
FIG. 4 is a schematic diagram showing a JTAG link structure of a single board to be upgraded according to an example embodiment of the present invention.

FIG. 4 is a schematic diagram showing a JTAG link structure of a single board to be upgraded according to an example embodiment of the present invention. As shown in FIG. 4, the link structure may include: a JTAG bridge chip, which is configured to divide a JTAG bus into multiple JTAG links, called sublink 1, . . . and sublink n respectively, and is connected with JTAG devices on the single board according to different classification standards, wherein one JTAG sublink may be connected with multiple JTAG devices in a daisy chain form. The JTAG link structure of the master control single board is the same as the JTAG link structure of other ordinary single boards to be upgraded. The sublink n, as a JTAG link divided from the JTAG bus by the JTAG bridge chip, can be connected with one or more JTAG devices, wherein n is a positive integer, and a maximum value of n is determined by a specific adopted chip. The JTAG devices are equipment or chips supporting a JTAG protocol.

It is important to note that the upgrading control single board can upgrade the devices on only one sublink on the single board to be upgraded by executing the upgrading operation once, and the devices on different sublinks can not be upgraded at the same time.

In the example embodiment, the upgrading control single board is mainly configured to request for and load the firmware upgrading data into a specific storage area of the JTAG controller, and call driving codes of the JTAG controller through the CPU to enable a procedure of loading the firmware upgrading data into the JTAG devices or the JTAG links. After receiving the firmware upgrading request, the upgrading control single board performs scanning according to the request parameter to acquire physical information of the JTAG devices to be upgraded, requests for firmware data to be upgraded from the master control single board, loads the firmware data to be upgraded, and stores the data acquired by the upgrading control single board into a specific data storage area of the JTAG controller. The JTAG controller and the bridge chip of the single board to be upgraded complete loading the firmware data together. In the example embodiment, two upgrading control single boards are additionally provided with the JTAG controller and the JTAG bridge chip, and active and standby states of the single boards are selected by an active and standby logic, so that mutual backup of the active and standby single boards is implemented to improve reliability, and the single boards may be mutually upgraded by active/standby switching. The design of the JTAG bridge chip of the upgrading control single board in a standby state is the same as that of an ordinary single board to be upgraded.

In the example embodiment, the JTAG controller is arranged on the upgrading control single board, and cooperates with the JTAG bridge chip to complete burning the firmware upgrading data. The JTAG controller receives the firmware upgrading data and instruction transmitted by the CPU, generates the JTAG signal, and sends the data to the JTAG chips of the single boards to be upgraded through the JTAG bus to complete loading the firmware upgrading data. In addition, the JTAG controller may receive a JTAG signal from the single boards to be upgraded and feed back firmware upgrading results.

The JTAG bridge chip is mainly responsible for parsing the received firmware upgrading data, and can divide the JTAG bus entering the single board into multiple JTAG links and connect all the JTAG devices on the single board according to different classification standards, wherein one JTAG sublink can connect multiple JTAG devices in the daisy chain form. The JTAG bridge chip and the JTAG controller may be used in cooperation.

The JTAG bus is a firmware upgrading bus on a backboard, and can transmit JTAG signals. The bridge chips of various single boards are connected through the JTAG bus, and then the bridge chip of each single board divides the JTAG bus entering the single board into multiple JTAG links and connects all the devices supporting JTAG on the board according to different classification standards. The JTAG controller can access the JTAG devices on the single board through the JTAG bus, thereby implementing firmware upgrading.

Figure 5:
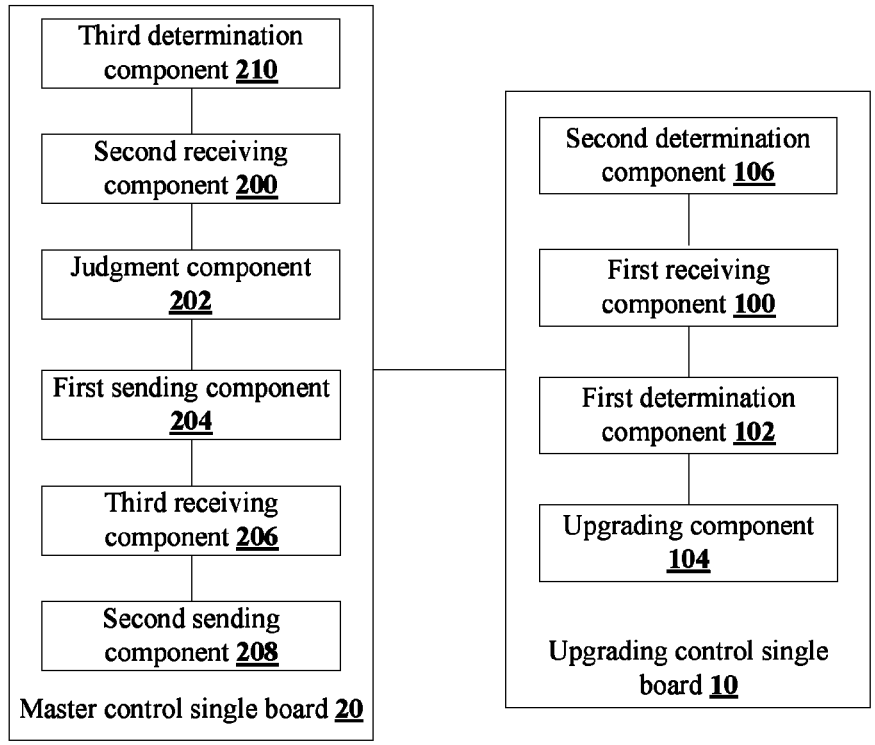
FIG. 5 is a structure diagram of a system for upgrading firmware according to an example embodiment of the present invention.

In an example embodiment, as shown in FIG. 5, the system may further include: at least one master control single board 20, wherein the master control single board 20 may include: a second receiving component 200, configured to receive state information from the upgrading control single board; a judgment component 202, configured to judge, according to the state information, whether the upgrading control single board is currently executing firmware upgrading operation or not; and a first sending component 204, configured to, when output of the judgment component is that the upgrading control single board is not executing the firmware upgrading operation currently, send the firmware upgrading request to the upgrading control single board.

In the example embodiment, the master control single board is mainly responsible for controlling a firmware upgrading process. The firmware upgrading data is stored in the master control single board, and a firmware upgrading data management component is installed in the master control single board. The master control single board may perform data interaction with the upgrading control single board to load the firmware upgrading data stored in the master control single board into the upgrading control single board. In an example embodiment, two master control single boards may respectively decide whether the current single board is in an active state or a standby state by virtue of software, and the single board in the standby state is turned into a single board to be upgraded. The active and standby master control single boards synchronize the firmware upgrading data between the active and standby master control single boards through an internal communication network, so that mutual backup of the active and standby single boards is implemented to improve reliability, and the single boards may be mutually upgraded by active/standby switching. When a master control single board is used as a single board to be upgraded, the design of its JTAG chip is the same as that of an ordinary single board to be upgraded.

As an example, assuming that there are 10 single boards at present, then the 10 single boards may include: 2 master control single boards, 2 upgrading control single boards and 6 single boards to be upgraded, one master control single board in the active state and one upgrading control single board in the active state may be selected, and the other master control single board in the standby state, the other upgrading control single board in the standby state and the 6 single boards to be upgraded are used as single boards to be upgraded in the current system.

In an example embodiment, the first determination component 102 may include: an acquisition element (not shown in the drawings), configured to acquire, according to the firmware upgrading parameter information, physical parameter information corresponding to the sublink to be upgraded; and a determination element (not shown in the drawings), configured to determine, according to the physical parameter information, the sublink to be upgraded.

In an example embodiment, as shown in FIG. 5, the master control single board 20 may further include: a third receiving component 206, configured to receive a firmware upgrading data request from the upgrading control single board; and a second sending component 208, configured to search, according to the firmware upgrading data request, for the firmware upgrading data corresponding to the sublink to be upgraded, and send the firmware upgrading data to the upgrading control single board.

In an example embodiment, as shown in FIG. 5, the upgrading control single board 10 may further include: a second determination component 106, configured to determine that a current using state of the upgrading control single board is an active state; and the master control single board 20 may further include: a third determination component 210, configured to determine that a current using state of the master control single board is an active state.

Figure 6:
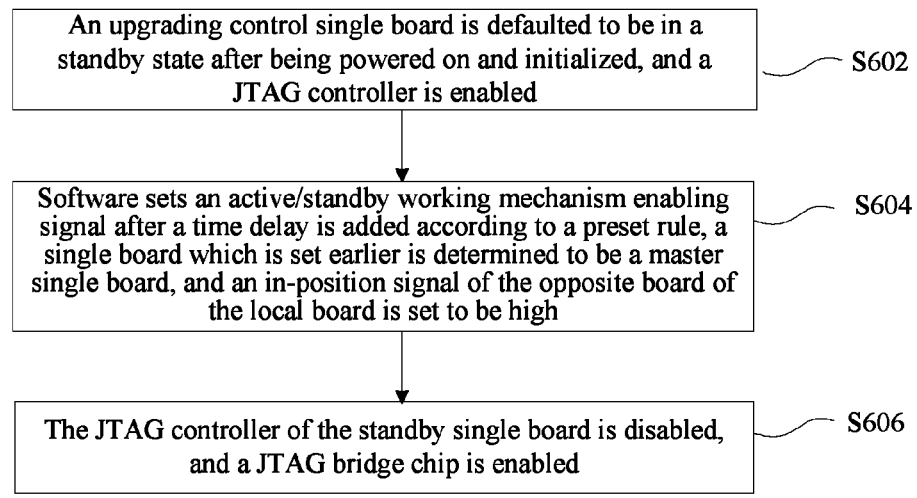
FIG. 6 is a flowchart of selection of an active upgrading control single board according to an example embodiment of the present invention.

In the example embodiment, FIG. 6 is a flowchart of selection of an active upgrading control single board according to an example embodiment of the present invention. As shown in FIG. 6, an opposite board location signal is taken as an active/standby logic selection signal of the upgrading control single board, and when an in-position signal of the opposite single board transmitted by the opposite single board is high, the local board is in the standby state, and the flow may include the following steps:

Step S602: the upgrading control single board is defaulted to be in the standby state after being powered on and initialized, and the JTAG controller is enabled;

Step S604: an active/standby working mechanism enabling signal is set after a time delay is added according to a preset rule, the single board which sets the signal earlier is determined to be a master single board, and the in-position signal of the opposite single board of the local board is set to be high; and Step S606: the standby single board disables the JTAG controller, and enables the JTAG bridge chip.

The example implementation process is further described below with reference to example implementation modes shown in FIG. 7 and FIG. 8.

Figure 7:
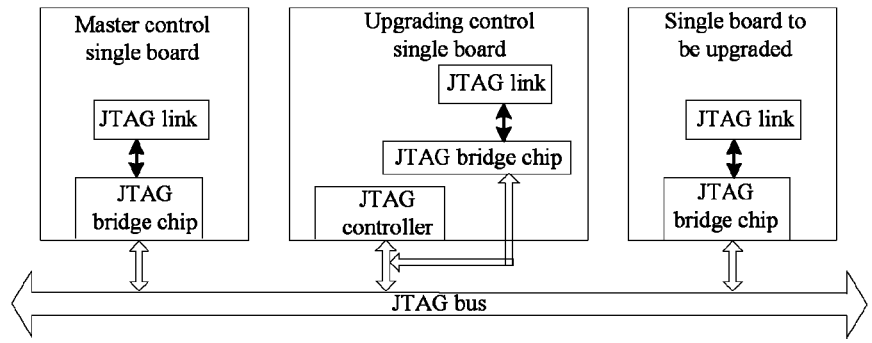
FIG. 7 is a schematic diagram showing an overall JTAG link structure of a firmware upgrading device according to an example embodiment of the present invention.

FIG. 7 is a schematic diagram showing an overall JTAG link structure of a firmware upgrading device according to an example embodiment of the present invention. As shown in FIG. 7, the overall structure is as follows: a JTAG bus refers to a firmware upgrading bus on a backboard, and transmits a JTAG signal. Each single board is connected in parallel with the JTAG bus through a JTAG bridge chip, and JTAG devices on a master control single board, an upgrading control single board and single boards to be upgraded are connected in a form of JTAG chain, so that the JTAG controller may access the JTAG devices on each single board to implement the firmware upgrading of the JTAG devices through the JTAG bus.

Figure 8:
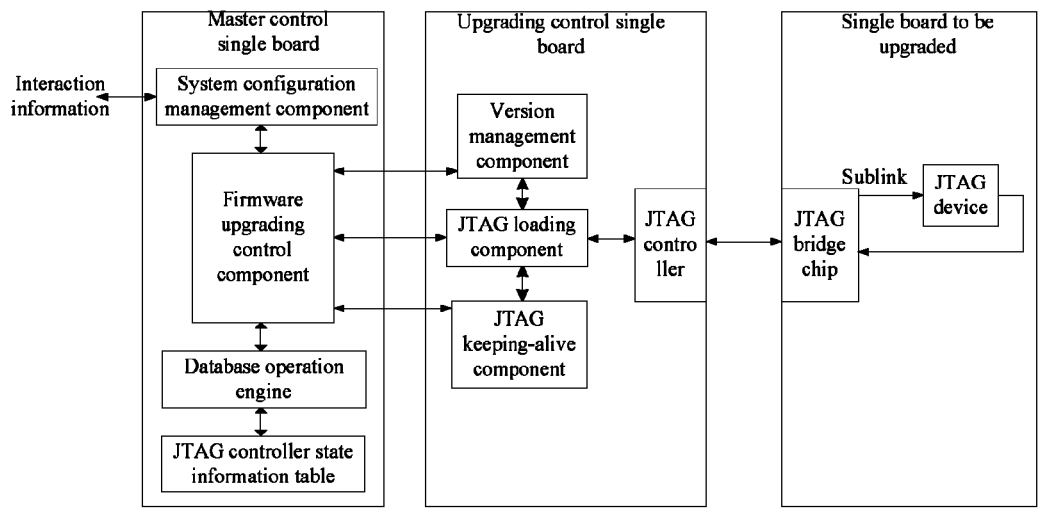
FIG. 8 is a schematic diagram showing an overall structure of a system for upgrading firmware according to an example embodiment of the present invention.

FIG. 8 is a schematic diagram showing an overall structure of a system for upgrading firmware according to an example embodiment of the present invention. As shown in FIG. 8, the overall structure of the system for upgrading firmware may include:

at least one master control single board, connected with a PC through an Ethernet port to perform information interaction with a user, wherein a system configuration management component, a firmware upgrading control component, a database operation engine and a JTAG controller state information table may be installed on the master control single board; at least one upgrading control single board to which a JTAG controller is newly added, wherein a version management component, a JTAG loading component and a JTAG keeping-alive component are installed on the upgrading control single board; and at least one single board to be upgraded to which a JTAG bridge chip is newly added, wherein JTAG devices are connected to a JTAG sublink. The master control single board, the upgrading control single board and the single board to be upgraded may perform interaction through an internal control plane.

The system configuration management component is configured to parse and transmit interaction information between the user and an upgrading device. Specifically, the system configuration management component is configured to receive and parse a firmware upgrading command in a receiving direction, and parse and transmit various types of error information in a firmware upgrading process in real time in a sending direction.

The firmware upgrading control component (including the second receiving component, the judgment component, the first sending component, the third receiving component and the second sending component) is configured to control a firmware upgrading flow. The firmware upgrading control component receives a firmware upgrading parameter from the system configuration management component, calls the database operation engine to query the JTAG controller state information table to acquire state information of the JTAG controller, terminates the current firmware upgrading operation if the JTAG controller is executing firmware upgrading operation; otherwise the firmware upgrading control component sends a firmware upgrading request to the JTAG loading component, and simultaneously updates, through the database operation engine, a state of the JTAG controller in the JTAG controller state information table to be executing firmware upgrading operation. The firmware upgrading control component is further configured to maintain firmware data to be upgraded.

The database operation engine is configured to operate and maintain the JTAG controller state information table, including: retrieval, addition and deletion of storage unit data of the JTAG controller state information table.

The JTAG controller state information table is configured to store information about a location, state and the like of the JTAG controller.

The JTAG loading component (including the first receiving component and the first determination component) is configured to send a request for JTAG controller location and state registration information to the firmware upgrading control component in a starting process of a single board; perform scanning, according to the firmware upgrading request of the firmware upgrading control component, to acquire a physical parameter of equipment to be upgraded, and call the version management component to request for the firmware data to be upgraded from the firmware upgrading control component; after the firmware data to be upgraded is successfully loaded, call a driving code of the JTAG controller to enable a firmware upgrading operation process to complete burning firmware to be upgraded through a CPU; and simultaneously activate the JTAG keeping-alive component to start a JTAG keeping-alive function and disable the keeping-alive function after firmware upgrading is completed.

The version management component is configured to request to load the firmware data to be upgraded.

The JTAG keeping-alive component is controlled by the JTAG loading component, and is configured to activate or deactivate the JTAG keeping-alive function. When the JTAG keeping-alive function is activated, a keeping-alive message is periodically sent to the firmware upgrading control component to ensure that the upgrading control single board is normal in the firmware upgrading process.

The JTAG controller (equivalent to the upgrading component) is controlled by the CPU of the upgrading control single board, connects the JTAG bridge chips of each single board in a bus form, and may send JTAG protocol data to the JTAG bridge chips to address the single boards and operate JTAG links on the single boards.

The JTAG bridge chips are slave equipment of a JTAG system, multiple bridge chips are mounted on the JTAG bus, and each JTAG bridge chip divides the JTAG bus entering the single board into multiple JTAG links, and connects all the equipment or chips supporting JTAG on the single board according to different classification standards, wherein one JTAG sublink may be connected with multiple devices in a form of daisy chain. The JTAG bridge chips address the single boards by receiving the protocol data from the JTAG controller, and operate the JTAG links on the single boards.

Sublinks are JTAG sublinks of the JTAG bridge chips, and may connect the equipment or chips supporting JTAG in a classification manner.

The JTAG devices support firmware upgrading in a JTAG manner, and are connected to the JTAG sublinks.

The example implementation process is further described with reference to an example implementation mode shown in FIG. 9.

Figure 9:
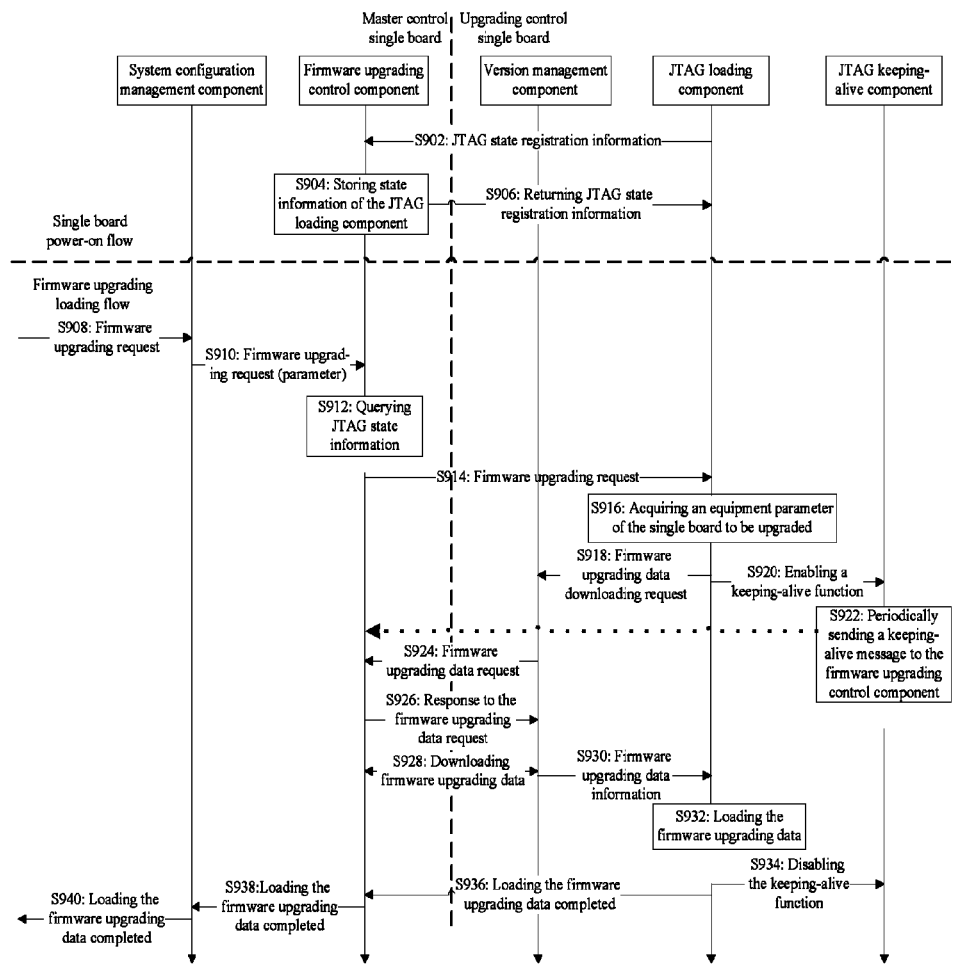
FIG. 9 is a flowchart of a method for upgrading firmware for a multi-processor distributed system according to an example embodiment of the present invention.

FIG. 9 is a flowchart of a method for upgrading firmware for a multi-processor distributed system according to an example embodiment of the present invention. As shown in FIG. 9, designs of JTAG bridge chips of a master control single board and an upgrading control single board in a standby state are the same as that of an ordinary single board to be upgraded. The flow may include the following steps:

Step S902: a JTAG loading component sends a JTAG state registration message to a firmware upgrading control component;

Step S904: the firmware upgrading control component stores state information of the JTAG loading component;

Step S906: the firmware upgrading control component returns a message to the JTAG loading component to confirm that the firmware upgrading control component has received the registration message sent by the JTAG loading component;

Step S908: a user initiates a firmware upgrading request;

Step S910: a system configuration management component parses a firmware upgrading request, and notifies the firmware upgrading control component to perform firmware upgrading operation;

Step S912: the firmware upgrading control component queries a JTAG state information table to obtain JTAG state information; Step S914: the firmware upgrading control component sends the firmware upgrading request according to the queried JTAG state information (the JTAG state information may include: JTAG loading component location information);

Step S916: the JTAG loading component acquires an equipment parameter on a single board to be upgraded according to a parameter in the received firmware upgrading request;

Step S918: the JTAG loading component sends a firmware upgrading data downloading request to a version management component;

Step S920: the JTAG loading component activates a JTAG keeping-alive component to enable a JTAG keeping-alive function;

Step S922: the JTAG keeping-alive component periodically sends a keeping-alive message to the firmware upgrading component after being activated;

Step S924: the version management component sends the firmware upgrading data downloading request to the firmware upgrading control component;

Step S926: the firmware upgrading control component searches for corresponding upgrading data according to the parameter in the request, and sends a response message to the version management component;

Step S928: the version management component downloads firmware upgrading data;

Step S930: after successfully downloading the firmware upgrading data, the version management component notifies firmware upgrading data information to the JTAG loading component to notify the JTAG loading component to start firmware upgrading operation;

Step S932: the JTAG loading component loads the firmware upgrading data;

Step S934: the JTAG loading component disables the JTAG keeping-alive function of the JTAG keeping-alive component after completing loading the firmware upgrading data;

Step S936: the JTAG loading component notifies the firmware upgrading control component that the loading of the firmware upgrading data is completed;

Step S938: the firmware upgrading control component notifies the system configuration management component that firmware upgrading is completed; and Step S940: the system configuration management component parses an upgrading result parameter, and notifies the upgrading result parameter to the user.

From the above, it can be seen that the embodiments achieves technical effects as follows (it is important to note that the effects may be achieved by some example embodiments): according to the technical solution provided by the embodiments of the present invention, with the introduction of the upgrading control single board, the time-consuming operation of loading the firmware upgrading data to the JTAG controller is separated from the master control single board, so that the risk in the firmware upgrading operation is reduced; and in addition, the system-level JTAG technology is introduced, and firmware upgrading data burning operation is cooperatively completed by the JTAG controller and the JTAG bridge chip, thereby implementing remote firmware upgrading on one hand, and performing firmware upgrading on one or more JTAG devices on a sublink under a condition that a bare single board to be upgraded is powered-on on the other hand. In this way, the problem that executing firmware upgrading operation by virtue of the master control single board greatly increases the risk in firmware upgrading operation in the related art is solved, and the risk in the firmware upgrading operation is further lowered.

INDUSTRIAL PRACTICABILITY

From the above, the method and system for upgrading firmware provided by the embodiments of the present invention has beneficial effects as follows: with the introduction of the upgrading control single board, the time-consuming operation of loading the firmware upgrading data to the JTAG controller is separated from the master control single board, so that the risk in the firmware upgrading operation is reduced; and in addition, the system-level JTAG technology is introduced, and firmware upgrading data burning operation is cooperatively completed by the JTAG controller and the JTAG bridge chip, thereby implementing remote firmware upgrading on one hand, and performing firmware upgrading on one or more JTAG devices on a sublink under a condition that a bare single board to be upgraded is powered-on on the other hand, so that the risk in the firmware upgrading operation is further lowered.

Obviously, those skilled in the art should know that each component or step of the present invention may be implemented by a universal computing device, and the components or steps can be concentrated on a single computing device or distributed on a network formed by a plurality of computing devices, and may optionally be implemented by programmable codes executable for the computing devices, so that the components or steps may be stored in a storage device for execution with the computing devices, or the shown or described steps may be executed in a sequence different from the sequence here under a certain condition, or the components or steps may form each integrated circuit component, or multiple components or steps therein may form a single integrated circuit component for implementation. As a consequence, the present invention is not limited to any specific hardware and software combination.

The above is only the example embodiment of the present invention and not intended to limit the present invention, and for those skilled in the art, the present invention may have various modifications and variations. Any modifications, equivalent replacements, improvements and the like within the principle of the present invention shall fall within the scope of protection defined by the claims of the present invention.

What is claimed is:

1. A method for upgrading firmware, comprising:
receiving, by an upgrading control single board, a firmware upgrading request from a master control single board, wherein the firmware upgrading request carries firmware upgrading parameter information;
determining, by the upgrading control single board according to the firmware upgrading parameter information, a Joint Test Action Group (JTAG) sublink to be upgraded corresponding to the firmware upgrading parameter information, wherein the JTAG sublink to be upgraded is one JTAG sublink of a single board to be upgraded; and
acquiring, by the upgrading control single board from the master control single board, firmware upgrading data corresponding to the JTAG sublink to be upgraded, and upgrading, by adopting the firmware upgrading data, one or more pieces of firmware on the JTAG sublink to be upgraded, wherein the one or more pieces of firmware are arranged on one or more JTAG devices, the one or more JTAG devices are connected with the JTAG sublink in a form of daisy chain;
wherein upgrading, by adopting the firmware upgrading data, one or more pieces of firmware on the JTAG sublink to be upgraded comprises: storing, by the upgrading control single board, the firmware upgrading data into a specific data storage area of a JTAG controller of the upgrading control single board; and completing, by the JTAG controller and a JTAG bridge chip of the single board to be upgraded together, loading the firmware upgrading data to the one or more pieces of firmware.

2. The method according to claim 1, wherein before receiving, by the upgrading control single board, the firmware upgrading request from the master control single board, the method further comprises:
receiving, by the master control single board, state information from the upgrading control single board;
judging, by the master control single board according to the state information, whether the upgrading control single board is currently executing firmware upgrading operation or not; and
when it is judged by the master control single board that the upgrading control single board is not executing the firmware upgrading operation currently, sending, by the master control single board, the firmware upgrading request to the upgrading control single board.

3. The method according to claim 2, wherein before receiving, by the upgrading control single board, the firmware upgrading request from the master control single board, the method further comprises:
determining current using states of both the upgrading control single board and the master control single board to be active states.

4. The method according to claim 1, wherein determining, by the upgrading control single board according to the firmware upgrading parameter information, the JTAG sublink to be upgraded comprises:
acquiring, by the upgrading control single board according to the firmware upgrading parameter information, physical parameter information corresponding to the JTAG sublink to be upgraded; and determining, by the upgrading control single board according to the physical parameter information, the JTAG sublink to be upgraded.

5. The method according to claim 4, wherein before receiving, by the upgrading control single board, the firmware upgrading request from the master control single board, the method further comprises:
determining current using states of both the upgrading control single board and the master control single board to be active states.

6. The method according to claim 1, wherein before acquiring, by the upgrading control single board from the master control single board, the firmware upgrading data corresponding to the JTAG sublink to be upgraded, the method further comprises:
receiving, by the master control single board, a firmware upgrading data request from the upgrading control single board; and
searching, by the master control single board according to the firmware upgrading data request, for the firmware upgrading data corresponding to the JTAG sublink to be upgraded, and sending the firmware upgrading data to the upgrading control single board.

7. The method according to claim 6, wherein before receiving, by the upgrading control single board, the firmware upgrading request from the master control single board, the method further comprises:
determining current using states of both the upgrading control single board and the master control single board to be active states.

8. The method according to claim 1, wherein before receiving, by the upgrading control single board, the firmware upgrading request from the master control single board, the method further comprises:
determining current using states of both the upgrading control single board and the master control single board to be active states.

9. A system for upgrading firmware, comprising: at least one upgrading control single board,
the upgrading control single board comprising:
a first receiving component, configured to receive a firmware upgrading request from a master control single board, wherein the firmware upgrading request carries firmware upgrading parameter information;
a first determination component, configured to determine, according to the firmware upgrading parameter information, a Joint Test Action Group (JTAG) sublink to be upgraded corresponding to the firmware upgrading parameter information, wherein the JTAG sublink to be upgraded is one JTAG sublink of a single board to be upgraded; and
an upgrading component, configured to acquire, from the master control single board, firmware upgrading data corresponding to the JTAG sublink to be upgraded, and upgrade, by adopting the firmware upgrading data, one or more pieces of firmware on the JTAG sublink to be upgraded, wherein the one or more pieces of firmware are arranged on one or more JTAG devices, the one or more JTAG devices are connected with the JTAG sublink in a form of daisy chain;
the upgrading component is further configured to store the firmware upgrading data into a specific data storage area of a JTAG controller of the upgrading control single board, and complete loading the firmware upgrading data to the one or more pieces of firmware by the JTAG controller together with a JTAG bridge chip of the single board to be upgraded.

10. The system according to claim 9, further comprising: at least one master control single board, wherein
the master control single board comprises:
a second receiving component, configured to receive state information from the upgrading control single board;
a judgment component, configured to judge, according to the state information, whether the upgrading control single board is currently executing firmware upgrading operation or not; and
a first sending component, configured to, when output of the judgment component is that the upgrading control single board is not executing the firmware upgrading operation currently, send the firmware upgrading request to the upgrading control single board.

11. The system according to claim 10, wherein
the upgrading control single board further comprises:
a second determination component, configured to determine that a current using state of the upgrading control single board is an active state; and
the master control single board further comprises:
a third determination component, configured to determine that a current using state of the master control single board is an active state.

12. The system according to claim 9, wherein the first determination component comprises:
an acquisition element, configured to acquire, according to the firmware upgrading parameter information, physical parameter information corresponding to the JTAG sublink to be upgraded; and
a determination element, configured to determine, according to the physical parameter information, the JTAG sublink to be upgraded.

13. The system according to claim 12, wherein
the upgrading control single board further comprises:
a second determination component, configured to determine that a current using state of the upgrading control single board is an active state; and
the master control single board further comprises:
a third determination component, configured to determine that a current using state of the master control single board is an active state.

14. The system according to claim 9, wherein the master control single board further comprises:
a third receiving component, configured to receive a firmware upgrading data request from the upgrading control single board; and
a second sending component, configured to search, according to the firmware upgrading data request, for the firmware upgrading data corresponding to the JTAG sublink to be upgraded, and send the firmware upgrading data to the upgrading control single board.

15. The system according to claim 14, wherein
the upgrading control single board further comprises:
a second determination component, configured to determine that a current using state of the upgrading control single board is an active state; and
the master control single board further comprises:
a third determination component, configured to determine that a current using state of the master control single board is an active state.

16. The system according to claim 9, wherein
the upgrading control single board further comprises:
a second determination component, configured to determine that a current using state of the upgrading control single board is an active state; and
the master control single board further comprises:

a third determination component, configured to determine that a current using state of the master control single board is an active state.

* * * * *